United States Patent

[11] 3,632,236

[72] Inventor Max Edward Grantham
Plympton, England
[21] Appl. No. 887,120
[22] Filed Dec. 22, 1969
[45] Patented Jan. 4, 1972
[73] Assignee Tecalemit (Engineering) Limited
[32] Priority Jan. 3, 1969
[33] Great Britain
[31] 596/69

[54] CAM OPERATED FLUID PUMPS
5 Claims, 4 Drawing Figs.

[52] U.S. Cl. ................................................ 417/471,
92/129
[51] Int. Cl. ..................................................... F04b 19/00,
F04b 37/00
[50] Field of Search ......................................... 92/129;
417/471, 425, 426, 248; 74/56

[56] References Cited
UNITED STATES PATENTS

| | | | |
|---|---|---|---|
| 2,819,678 | 1/1958 | Nordell et al. ............ | 74/56 X |
| 3,307,483 | 3/1967 | Von Plato .................. | 417/471 |
| 3,314,594 | 4/1967 | Rietdijk ..................... | 417/244 X |
| 3,524,715 | 8/1970 | Grantham .................. | 92/129 |

*Primary Examiner*—Carlton R. Croyle
*Assistant Examiner*—R. E. Gluck
*Attorney*—Mason, Kolehmainen, Rathburn & Wyss

ABSTRACT: This invention relates to a fluid pump comprising a piston which is reciprocable in a cylinder against a biasing force which may be a helical spring. The piston is caused to reciprocate in the cylinder by means of a cam system therein which may be a ball rotated by a helical cam surface on one face of the piston.

PATENTED JAN 4 1972

3,632,236

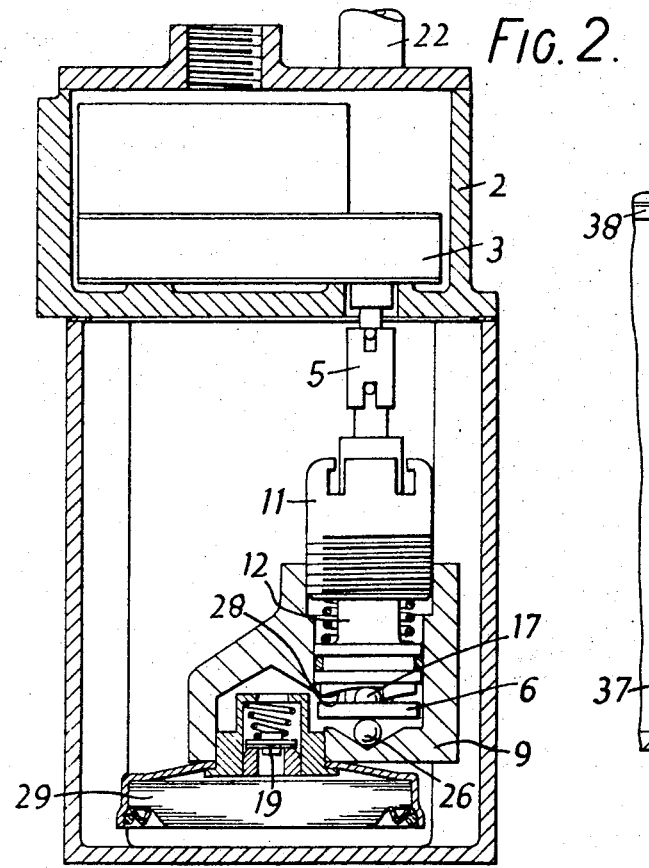
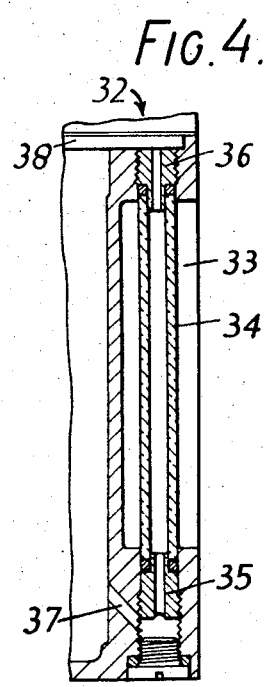
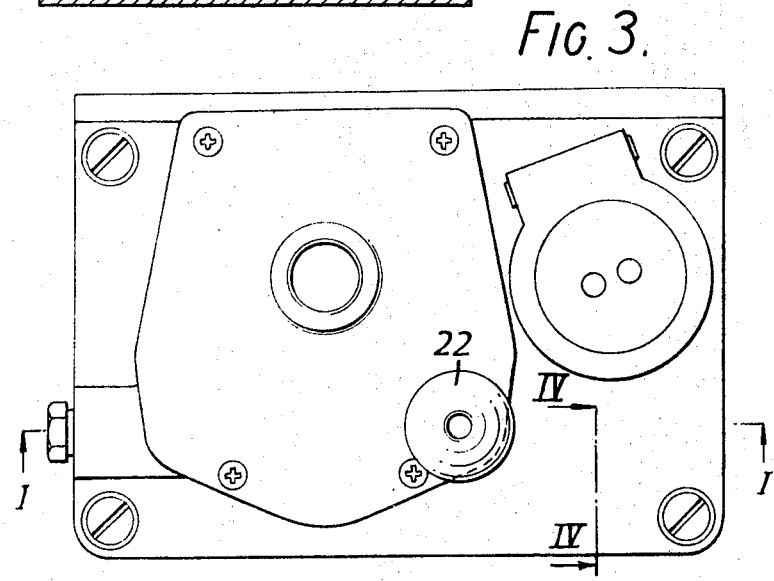

CAM OPERATED FLUID PUMPS

This invention relates to cam operated reciprocating fluid pumps for use in a fluid system such as a lubricating system.

According to the invention a fluid pump comprises a cylinder having inlet and outlet ports and a piston reciprocable within the cylinder against a biasing force by a helical cam system around the centerline of the piston and cooperating with a face thereof.

Preferably the face of the piston has a helical cam surface thereon which cooperates with a cam member rotatable relative to the helical cam surface. Desirably, the cam member is a ball between the helical cam surface on the piston and a ball support surface rotatable with respect to the piston.

A compact and convenient way of rotating the ball support surface with respect to the piston is to journal this surface to a shaft which passes through the piston and is rotated by any suitable means such as an electric motor. In order to retain the ball in its path, a shield may be provided around the periphery of the ball support surface.

In a preferred construction, the biasing force for the piston is a helical spring fitted around the upper region of the piston between an annular abutment thereon and a sleeve attached to the cylinder.

In order to keep friction losses in the pump to a minimum, the rotatable shaft carrying the ball support surface may be supported on a second ball disposed in a recess at the bottom of the cylinder. This ball is largely responsible for the very low-frictional characteristics and high-locational flexibility of the whole assembly. Further reductions in friction losses are also achieved by the rolling contact of the ball of the moving parts of the cam system.

According to a further feature of the invention, a passageway may be provided connecting a second sealed cylinder to the main cylinder of the pump and this second cylinder has a piston reciprocable therein, the stroke of which can conveniently be altered by suitable means thereby changing the output capacity of the pump. This second piston may be connected to means external of the pump which move with the reciprocating movement of the second piston. This feature serves a useful purpose in that when the pump is in operation, as the second piston moves in sympathy with the first piston, a visual indication, that the pump is in fact operating can readily be seen externally of the pump. This second piston also serves another useful purpose in that it can be used to prime the main cylinder before the pump is set into operation.

Each of the inlet and outlet ports may be closed by a one-way valve and it will be readily appreciated that the valve in the outlet port can be provided externally of the pump. Further it will be appreciated that the dimensions of the pump can be selected so as to provide the pump with any desired output capacity.

The invention will now be described, by way of example, with reference to the accompanying diagrammatic drawings, in which:

FIG. 2 is a view of a section taken along the line II—II in FIG. 1;

FIG. 3 is a plan view of the pump of FIG. 1, and

FIG. 4 illustrates a sight glass assembly incorporated in the pump.

Figure 1:
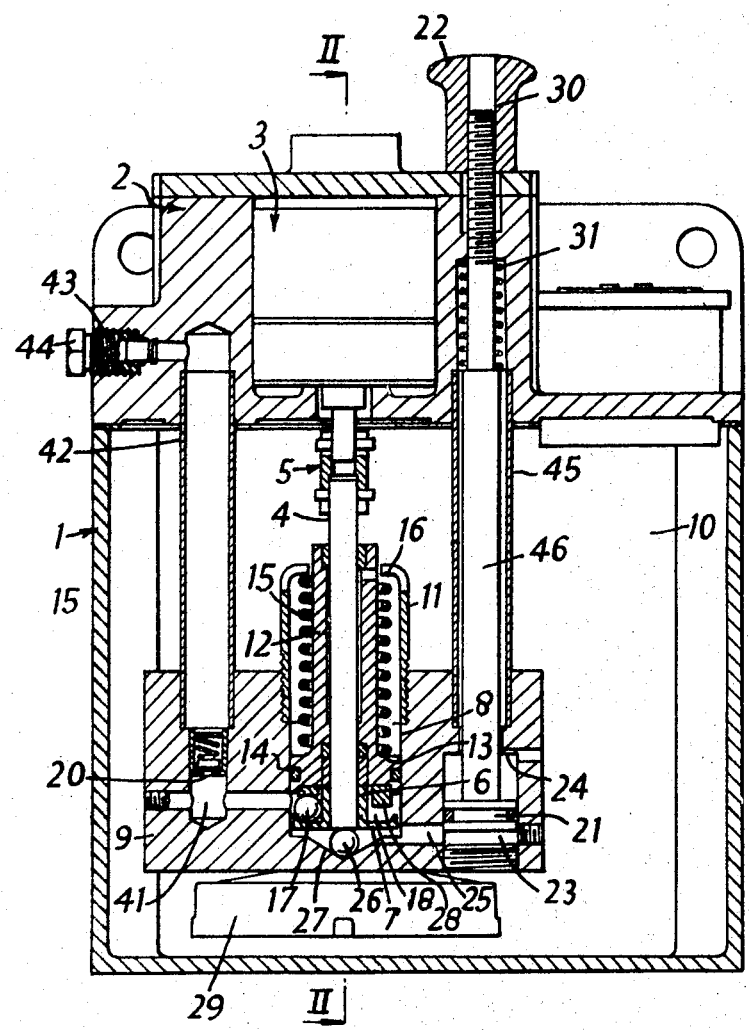
FIG. 1 is a cross section through a pump according to the invention.

Referring to the drawings there is shown a cyclic pump having a case 1 and a lid structure 2 which houses an electric motor 3. The electric motor is connected to a drive shaft 4 by means of a coupling 5. A drive plate 6 provided with a thrust face 7 is attached to the end of the shaft 4.

The drive shaft and drive plate fit into a cylinder 8 in a block assembly 9, which assembly is disposed in the tank or reservoir portion 10 of the pump. The cylinder 8 is increased in diameter at the end nearest the motor to receive a sleeve 11. A piston 12 is arranged around the shaft 4 and in sliding engagement therewith, and is adapted to fit into the cylinder 8, the piston having an annular abutment face 13 and a sealing ring 14 of suitable material. The piston assembly is spring biased by means of a helical spring 15 fitted around the piston and abutting against face 13 of the piston and inner surface 16 of the sleeve 11.

The bottom of the piston is formed with a cam surface 28 and interposed between this cam surface and the drive plate is a ball 17.

The piston and cam surface are manufactured as a single unit and are constrained to make a reciprocating motion only, thus rotation of the drive plate 6 causes the ball 17 to roll between the cam and the thrust face 7, which results in a reciprocating motion of the piston. As the piston is raised, the consequent depression induced in chamber 18 results in fluid entering the cylinder through a spring biased inlet valve 19 (FIG. 2). On the return motion of the piston, the valve 19 closes under the action of the spring and fluid is forced out of the pump through a nonreturn valve 20 in the outlet duct 41. In FIG. 1, the outlet duct 41 which is formed in the block 9 is connected by a pipe 42 to an outlet takeoff point 43 provided in the lid of the pump, this takeoff point 43 having a union 44 so that the necessary pipe lines can be connected thereto.

In addition to the cam-operated piston 12, there is provided an auxiliary second piston 21, which performs three functions. Firstly it may be used as a priming attachment for the main pumping chamber 18, secondly it provides a visual check on whether the pump is operating or not, and lastly it provides a means whereby the output of the pump can be adjusted while remaining remote mechanically from the main operating piston.

In order to adjust the output of the pump, a hand knob 22, having threads 30 which cooperate with corresponding threads on the end of the piston 21, can be rotated thereby raising or lowering the piston 21 in a secondary chamber 23 and thus varying the stroke of the auxiliary piston. When the piston abuts against shoulder 24, the pump is set at maximum output. According to the adjustment of the hand knob 22, the stroke of the auxiliary pump is restricted and will in its remaining stroke operate in sympathy hydraulically with the main piston via an interconnecting passage 25. In the drawings, the stem of the piston 46 is shown enclosed in a tube 45, the ends of which are fitted into the block 9 and the casing lid respectively. This tube 45 can be omitted if required providing a suitable fluid seal is provided between the piston stem and the block.

The drive shaft 4 is located by means of the piston 12 which in turn is located in the cylinder bore 8 over a short length of loosely fitting seal housing thereby allowing the drive plate end of the drive shaft to have a large positional tolerance in relation to the drive end of the shaft adjacent the motor 3. This is, of course, a considerable advantage in manufacture.

A thrust point for the whole piston assembly is provided by a ball 26 positioned in a recess 27 at the bottom of the cylinder 8. This ball is largely responsible for the very low-frictional frictional characteristics and high-locational flexibility of the whole assembly. reduction in friction is also achieved by the rolling contact of ball 17 between the cam surface 28 and the thrust face 7 of the drive plate.

A slight glass assembly 32 as shown in FIG. 4 can also be provided so that a visual indication of the contents of the reservoir can be established during operation. The sight glass is fitted into an indentation 33 in one of the sidewalls of the case 1 and comprises a glass tube 34 having plugs 35 and 36 at each end fitted into corresponding bores in the case and communicating with a breather passageway 37 and an inlet 38 respectively. When the reservoir in the tank is filled, the sight glass is also filled and drains simultaneously with the contents of the reservoir during operation to provide a visual indication of the contents of the reservoir at any time.

In operation, the tank 10 is filled with a fluid such as light ore and the auxiliary piston 21 is pumped manually two or three times to prime the main pumping chamber 18. The electric motor is then put into operation and consequently the drive shaft 4 is rotated. As the drive plate 6 is connected to this shaft, the drive plate is also rotated and causes the ball 17 to roll along the cam surface 28. This movement of the ball on the cam surface forces the piston 12 upwardly against the action of the biasing spring 15 and draws a charge of fluid to be pumped up through a filter element 29 and through the nonreturn valve 19 into the pumping chamber 18, the fluid also going into the secondary chamber 23 through the passage 25.

When the ball comes off the cam surface, the spring 15 forces the piston downwardly thereby forcing the charge of fluid out of the chambers 18 and 23, and out of the pump through the outlet duct 41 via the nonreturn valve 20. As the fluid is being pumped out, the secondary piston is raised providing the external visual indication that the pump has discharged its charge. At this stage the auxiliary piston is also forced downwardly by a spring 31 to the predetermined limit of its stroke and the pump is then ready to begin the next cycle.

Since the auxiliary piston moves in synchronism with the main cam operated piston, the knob at the top of the pump can be seen to reciprocate up and down while the pump is in operation, thereby providing a visual check as to the operation of the pump.

The pump described has a maximum capacity of 1 cc. since it has been designed for use in light industry for lubricating small machine tools, but the output of the pump can be varied by suitably modifying the bore of the cylinder or the length of the stroke.

I claim:

1. A fluid pump comprising a cylinder, a piston reciprocable in said cylinder to provide a pump chamber, inlet and outlet ports in said pump chamber, a spring biasing said piston in one direction, a cam system connected to the piston to reciprocate said piston, said cam system comprising, a first cam surface provided by a first end of said piston, a second cam surface, a drive member passing through said piston and drivably connected to said second cam surface to rotate said second cam surface about the axis of the piston, mounting means for mounting said drive member adjacent said second cam surface, a ball disposed between said cam surfaces to reciprocate said piston as the drive member rotates.

2. A fluid pump as claimed in claim 1 in which the mounting means comprises a ball situated between said drive member and a recess in the bottom of said cylinder.

3. A fluid pump as claimed in claim 1 in which said first and second cam surfaces are situated in said pump chamber.

4. A fluid pump as claimed in claim 1 further comprising a passageway, a second sealed cylinder, said passageway connecting said second sealed cylinder to said pump chamber, a second piston reciprocable in said second sealed cylinder and means to vary the stroke of said second piston.

5. A fluid pump as claimed in claim 1 in which said second cam surface is flat and said first cam surface includes a drop off.

* * * * *